(12) United States Patent
Thomas et al.

(10) Patent No.: US 7,658,960 B2
(45) Date of Patent: Feb. 9, 2010

(54) METHOD AND APPARATUS FOR MANUFACTURING DECORATED ICE CREAM CONFECTIONERY ITEMS

(75) Inventors: Rémi Thomas, Berneuil en Bray (FR); Christian Dufort, Nontron (FR); Jean-Francois Marie-Albert Tence, Coye la Foret (FR)

(73) Assignee: Nestec S.A., Vevey (CH)

( * ) Notice: Subject to any disclaimer, the term of this patent is extended or adjusted under 35 U.S.C. 154(b) by 365 days.

(21) Appl. No.: 10/899,051

(22) Filed: Jul. 27, 2004

(65) Prior Publication Data

US 2004/0258820 A1    Dec. 23, 2004

Related U.S. Application Data

(63) Continuation of application No. PCT/EP03/01039, filed on Feb. 3, 2003.

(30) Foreign Application Priority Data

Apr. 23, 2002    (EP) .................................. 02076611

(51) Int. Cl.
*A23G 9/00*    (2006.01)

(52) U.S. Cl. ........................ 426/516; 426/101; 426/303; 426/565

(58) Field of Classification Search ................. 426/516, 426/303; 425/91, 155; 99/450.1, 452, 486; *A23G 9/00*
See application file for complete search history.

(56) References Cited

U.S. PATENT DOCUMENTS

| | | | | |
|---|---|---|---|---|
| 1,890,069 A | * | 12/1932 | Triolo ......................... 425/114 |
| 3,385,234 A | * | 5/1968 | Anderson .................... 426/297 |
| 4,477,473 A | * | 10/1984 | Schoonmaker et al. ...... 426/231 |
| 4,542,028 A | | 9/1985 | Butcher et al. .............. 426/100 |
| 4,587,128 A | * | 5/1986 | Cummings ................... 426/303 |
| 4,751,878 A | | 6/1988 | Lopes ....................... 99/450.1 |
| 4,758,758 A | | 7/1988 | Laing |
| 4,828,854 A | | 5/1989 | Beer .......................... 426/104 |
| 4,913,645 A | | 4/1990 | Daouse et al. .............. 425/150 |
| 5,000,969 A | * | 3/1991 | Beer .......................... 426/101 |
| 5,079,015 A | * | 1/1992 | Herting ...................... 426/249 |
| 5,198,245 A | * | 3/1993 | Daouse ....................... 425/385 |

(Continued)

FOREIGN PATENT DOCUMENTS

DE    34 36 578 C    1/1986

(Continued)

*Primary Examiner*—Drew E Becker
*Assistant Examiner*—Steven Leff
(74) *Attorney, Agent, or Firm*—K&L Gates LLP

(57)    ABSTRACT

A method and device for manufacturing an ice cream dessert that includes a built-in ice cream confectionery decoration deposited in the form of a gathered frill folded over on itself, the folds of which run alternately in one direction then in the opposite direction by extrusion from a set of moving nozzles with flattened end-piece with slot-shaped nozzle outlet placed above a moving support. The apparatus includes a source of cold ice cream composition supplying at least one extruded ribbon of ice cream composition at a temperature of −6° C. or below, a support for the set of moving nozzles which is given an oscillating movement transversely with respect to the moving support, and a mechanical device for setting the oscillating support in motion. The method can be practiced by operation of the device.

8 Claims, 7 Drawing Sheets

U.S. PATENT DOCUMENTS 5,603,965 A * 2/1997 Daouse ................ 425/130

FOREIGN PATENT DOCUMENTS

| DE | 39 10 985 A | | 10/1990 |
|----|----|----|----|
| EP | 0 044 689 | | 1/1982 |
| EP | 0 234 376 | | 9/1987 |
| EP | 0 328 170 | | 8/1989 |
| EP | 0 328 170 | A2 | 8/1989 |
| EP | 0 366 978 | | 5/1990 |
| EP | 0 561 118 | | 1/1993 |
| EP | 0 713 650 | | 5/1996 |
| GB | 2 120 516 | A | 12/1983 |
| JP | 61 187751 | | 8/1986 |
| WO | 03 090544 | | 11/2003 |

* cited by examiner

METHOD AND APPARATUS FOR MANUFACTURING DECORATED ICE CREAM CONFECTIONERY ITEMS

CROSS-REFERENCE TO RELATED APPLICATIONS

This application is a continuation of International application PCT/EP03/01039 filed Feb. 3, 2003, the entire content of which is expressly incorporated herein by reference thereto.

BACKGROUND ART

The invention relates to the field of decorated ice cream confectionery items, particularly ice cream desserts with a complex attractive decoration reminiscent of the "art nouveau" style.

The application of continuous extrusion to the manufacture of decorated ice cream confectionery desserts is known.

The conventional method consists in depositing a continuous sausage of ice cream onto a moving conveyor belt. The sausage can then be decorated by depositing continuous or discontinuous decorative elements, for example, continuous elements, using auxiliary extrusion devices comprising fixed nozzles situated tangentially with respect to the sausage, for example moved back and forth in a plane parallel to the axis of the sausage. The decoration obtained is not very varied.

With a view to providing novel forms, EP-A-0 044 689 relates to a method and to an apparatus for manufacturing ice cream desserts using a rotary joint allowing the continuous extrusion of multicoloured twisted sausages of ice cream, that is to say products in which the mass of ice cream itself constitutes the decorative element on account of its form. The construction of a rotary extrusion head is relatively complicated: seals need to be provided between the moving parts and the fixed parts actually at the nozzle, and a mechanism has to be provided for driving the moving parts. Such a head is bulky and difficult to clean.

EP-A-0 328 170 relates to an ice cream dessert-decorating device, also employing a rotary head comprising a rotary joint moved by a programmable controller. In one embodiment, the device makes it possible to produce a ruffled decoration on round desserts by altering the relative flow rates of ice cream and the rate of rotation of the rotary joint of the distributor.

To the same end, EP-A-0 234 376 relates to an apparatus for the manufacture of decorated sausages of pasty products comprising no rotary nozzle, in which ice cream is extruded continuously from a nozzle secured to a moving support placed over a moving conveyor belt, the relative movements of the nozzle and the conveyor belt being such as to reproduce the movement that a confectioner gives to a piping nozzle to form a uniformly rolled continuous sausage.

EP-A-0 366 978 also relates to the production of decorated ice cream desserts without the use of a rotary joint, in which the mass of ice cream extruded itself constitutes the decoration, consisting in producing a superposition of layers of flat ribbons of ice cream using a flat nozzle situated over a conveyor belt moving slowly and parallel to it, by using the high speed of extrusion of the ice cream relative to the slow movement of the conveyor belt, which leads to the deposition under gravity of folded ribbons which overlap in the manner of pieces of cloth coming off a weaving loom. The forms obtained are not highly decorative.

It is found that, so far, there is no known method or device for the continuous manufacture of decorated ice cream desserts of complex form reminiscent of certain art nouveau décor, for example those achieved by the architect Gaudi. The present invention now provides thee features.

SUMMARY OF THE INVENTION

The present invention continuously and simply manufactures decorative ice cream desserts incorporating a complex decoration. The method of manufacturing an ice cream dessert with a built-in ice cream confectionery decoration is deposited by extrusion from at least one moving nozzle with flattened end-piece with slot-shaped nozzle outlet placed above a moving support. The method includes the following features:

an ice cream composition is extruded continuously in the form of ribbon(s) at a temperature of below $-6°$ C. at the extrusion nozzle or nozzles onto the moving support, the nozzle or nozzles is or are secured to an oscillating support given an oscillating movement transversal to the moving support, the nozzle furthest from the moving support is placed in such a way that the projection of the plane of the nozzle outlet of the said nozzle onto a plane parallel to the direction of travel of the moving support and perpendicular to the plane of the said moving support makes, when viewed in the direction of travel of the said support, an acute angle of at least 45° with the projection of the moving support onto the said plane, the speed at which the ice cream composition is extruded is greater than the speed of travel of the moving support, and the respective movements of the nozzle or nozzles and of the moving support are such that the ribbon deposited under gravity has the shape of a gathered frill folded over on itself, the folds of which run alternately in one direction and then in the opposite direction.

Another embodiment of the invention relates to a device for manufacturing an ice cream dessert comprising a built-in ice cream confectionery decoration deposited in the form of a gathered frill folded over on itself, the folds of which run alternately in one direction then in the opposite direction by extrusion from a set of moving nozzles with flattened end-piece with slot-shaped nozzle outlet placed above a moving support. This device preferably comprises:

a source of cold ice cream composition supplying at least one extruded ribbon of ice cream composition at a temperature of $-6°$ C. or below, a support for the set of moving nozzles which is given an oscillating movement transversely with respect to the moving support, means for setting the oscillating support in motion, such that:

the nozzle furthest from the moving support is placed in such a way that the projection of the plane of the nozzle outlet of the nozzle onto a plane parallel to the direction of travel of the moving support and perpendicular to the plane of the moving support makes, when viewed in the direction of travel of the support, an acute angle of at least 45° with the projection of the moving support onto the said plane, the speed at which the ice cream composition is extruded is greater than the speed of travel of the moving support, and the respective movements of the nozzle or nozzles and of the moving support are such that the ribbon deposited under gravity has the shape of a gathered frill folded over on itself, the folds of which run alternately in one direction then in the opposite direction.

The invention also relates to this type of decorated ice cream dessert in which the decoration is in the form of a gathered frill folded over on itself, the folds of which run alternately in one direction then in the opposite direction and which can be obtained by the method according to the invention.

BRIEF DESCRIPTION OF THE DRAWINGS

The invention will be better understood with the aid of the detailed description hereafter, given with reference to the drawings hereafter which are given by way of example and in which.

DETAILED DESCRIPTION OF THE PREFERRED EMBODIMENTS

Figure 1:
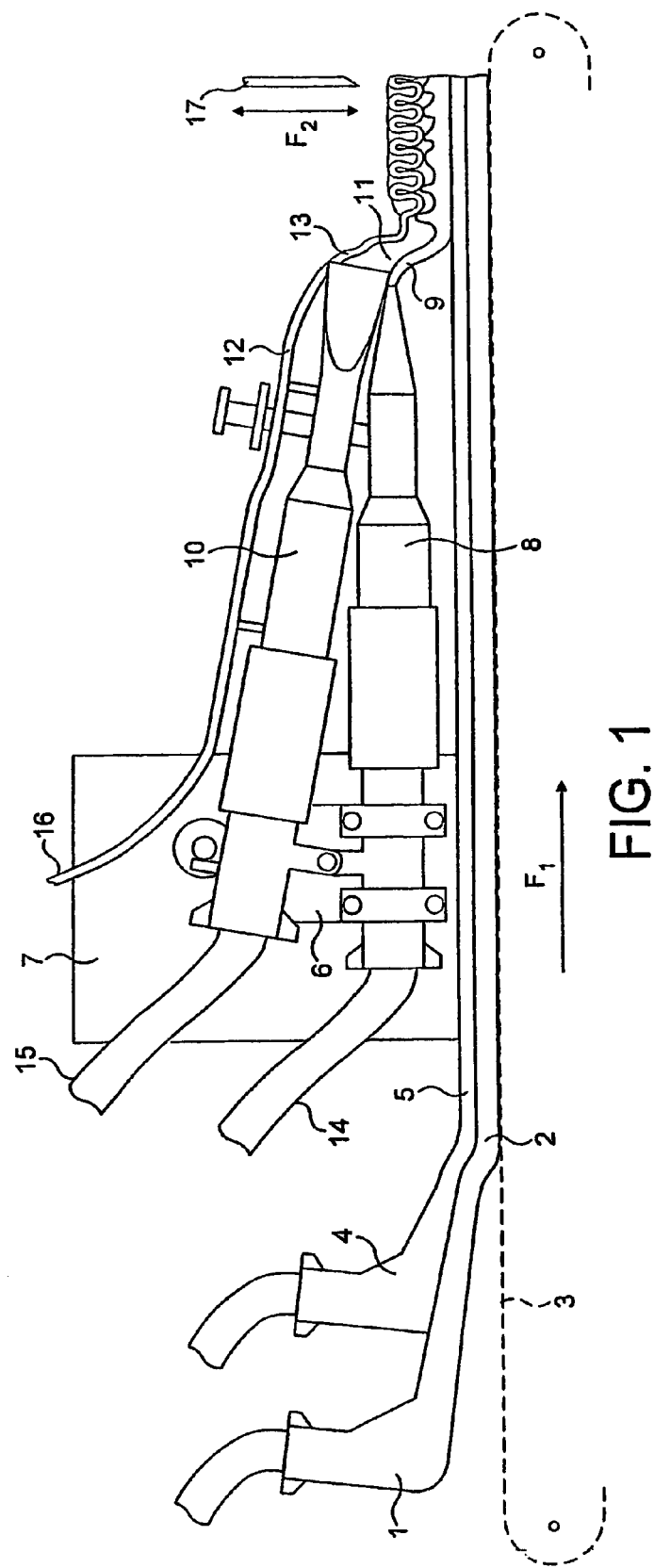
FIG. 1 is an overall schematic view of the apparatus.

In the context of the invention, a slot-shaped nozzle outlet of a flattened nozzle has a contour contained in a plane representing the plane of the nozzle outlet. The projection of this plane onto a vertical plane parallel to the direction of travel and perpendicular to the plane of the support defines a line which makes an acute angle of at least 45° and preferably an angle ranging to as high as 85°, for example approximately 75° to 85° with the horizontal in the said plane of projection, viewed in the direction of travel of the support. This is achieved in the particular embodiment of the invention that is depicted in the drawings by inclining the nozzle furthest away from the moving support, namely the upper nozzle, by an obtuse angle of 175° to 135° with respect to the horizontal, viewed in the direction of travel of the support.

A similar result could be achieved, without departing from the context of the invention, using an upper nozzle the axis of which is horizontal and the nozzle outlet of which is chamfered so that the plane of the nozzle outlet has the same orientation. As a further preference, two ribbons of ice cream composition can be extruded from two flattened moving nozzles more or less orthogonal to one another at their nozzle outlets. In one particularly advantageous embodiment, the flattened nozzles are arranged in such a way that their nozzle outlets form an inverted T. To emphasize the ruffle in the form of a gathered frill, the ribbon of ice cream composition deposited last may preferably comprise an edging of sauce at the border, making a visual contrast with the said ribbon.

According to the invention, it is essential that the form given to the decoration should remain without deformation both during the manufacture and during the distribution of the items, given the large area of decoration exposed to the surrounding air. It is therefore necessary to manufacture an extrudate which is particularly resistant to thermal shock. To do this, hard ice cream, obtained for example by hardening using a twin-screw extrusion device, if necessary associated with a freezer, as described for example in EP-A-0 561 118, or without a freezer as described in EP-A-0 713 650, is extruded cold at the coldest possible outlet temperature, i.e., about −6° C. or lower, and preferably below −10° C.

The decorated ice cream dessert that results has a decoration in the form of a gathered frill folded over on itself. Preferably, the folds of which run alternately in one direction then in the opposite direction. Such a dessert may comprise a mass of sponge cake, preferably extruded at negative temperature, for example as described in a copending application entitled BISCUIT EXTRUDABLE AT NEGATIVE TEMPERATURE, PROCESS OF PREPARATION AND USE IN COMPOSITE ICE CONFECTIONERY PRODUCTS, a continuation of International application PCT/EP03/01072 filed Feb. 4, 2003, the entire content of which is expressly incorporated herein by reference thereto.

As a preference of the device, two nozzles placed one above the other may be included, one of which is inclined with respect to the other. The nozzles are articulated to one another and have an angle of inclination with respect to the horizontal that can be adjusted using an adjusting means. As a preference, the axes of the nozzles make an angle of 5° to 15° between them.

Advantageously, the oscillating support comprises a first bracket to which the lower nozzle is fixed and to which the upper nozzle is articulated via an adjustable-length arm. The position of the upper nozzle with respect to the lower nozzle can be adjusted by means of the said adjustable-length arm articulated at its two ends.

As a further preference of the device, the means of setting the oscillating support in motion comprise:
- a moving vertical slideway secured to the said oscillating support via a first bracket,
- a set of rollers between which the slideway slides, the said rollers being fixed to a housing,
- a second bracket for fixing the slideway, and
- a crank with an adjustable lever, the drive shaft of which is connected to a motor and the eye of which is articulated to the second bracket.

In the description of the drawing figures, the same reference numerals denote the same elements.

In FIG. 1, a nozzle with flattened end-piece 1 is being used to extrude a flat ribbon of reconstituted sponge cake 2 onto a conveyor belt 3 moving in the direction of the arrow f1. Using the nozzle with flat end-piece 4, a flat ribbon of ice cream 5 from a freezer, not depicted, is extruded onto the sponge cake which acts as a base. Advantageously, the sponge cake is extruded at negative temperature, for example at approximately −5° C.

A set of nozzles articulated together is fixed to an oscillating support 6 moved by a mechanism contained in a casing 7. The set of nozzles comprises a first nozzle 8 with flattened end-piece the slotted nozzle outlet of which is more or less parallel to the conveyor belt 3, and via which a ribbon of ice cream 9 is extruded. The set of nozzles comprises a second nozzle 10 with flattened end-piece, the slotted nozzle outlet of which is more or less perpendicular to the conveyor belt 3, and via which a ribbon of ice cream 11 is extruded. Fixed to the nozzle 10, a duct 12 of small cross section delivers a sausage of sauce 13. The duct 12 opens onto the upper end of the flattened end-piece through its wall, which makes it possible to produce an edging of sauce on the upper edge of the ribbon 11 by coextrusion. The moving nozzles 8 and 10, and the duct 12 are connected to the sources of the respective products by flexible hoses 14, 15, and 16. Having deposited the composite decorative sausage on the moving layers, the assembly is cut into portions by the knife 17 which is raised and lowered in the direction of the arrow f2.

The portions are then conveyed to a hardening tunnel, hardened and then packaged for storage at a temperature less than −18° C., these operations not being depicted.

Figure 2:
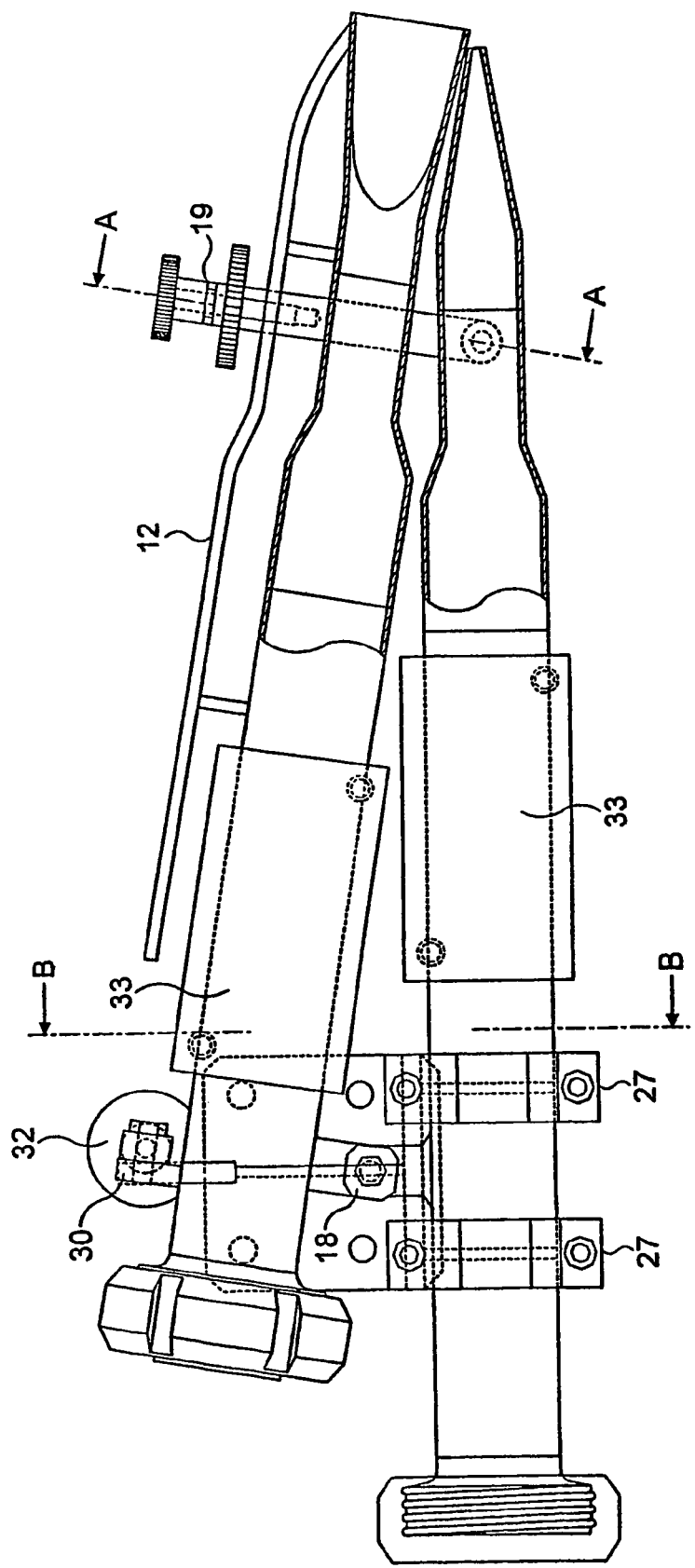
FIG. 2 is a detail view of the set of extrusion nozzles and of their oscillating support.
Figure 3:
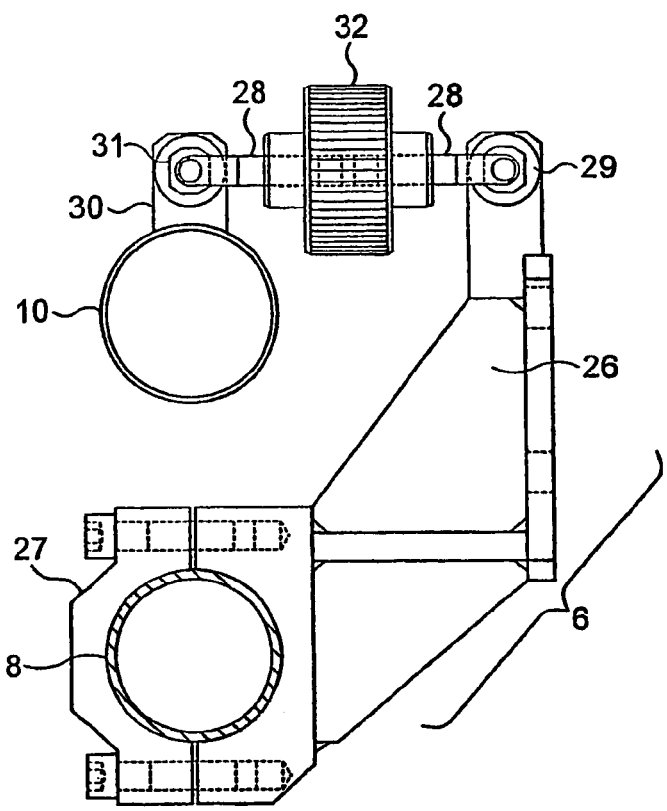
FIGS. 3 and 4 are views in section on AA and BB of FIG. 2, FIGS. 5, 6 and 7 are views, in the case of FIG. 5 in elevation and in part section on D of FIG. 6, and in the case of FIG. 6, viewed from above and in part section on C of FIG. 5 and, in the case of FIG. 7, viewed from the rear and in part section on E of FIG. 6 (depicted on a larger scale than FIGS. 5 and 6 for greater clarity), of the means of transmitting the oscillating movement to the support.
Figure 4:
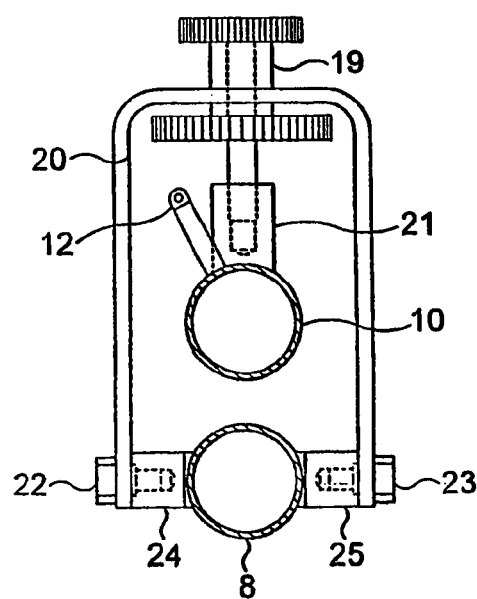

As shown in FIGS. 2, 3 and 4, the nozzles 8 and 10 are articulated together about the pivot axis 11 and their angle of a longitudinal inclination with respect to one another can be adjusted by means of the thumbwheel 19. This thumbwheel passes through the yoke 20 in its upper part and acts on a threaded nut 21 carried by the nozzle 10. Two tightening bolts 22, 23 pass through the branches of the yoke 20 and collaborate with threaded nuts 24, 25 fixed on each side of the nozzle 8 to act as a pivoting axle of attachment of the yoke 20 to the nozzle 8. The thumbwheel 19 makes sure that the nozzles are kept separate so as to avoid cold spots which could disrupt the flow of the ribbons of ice cream.

As shown in FIG. 3, the oscillating support 6 consists of a first bracket 26. The bracket 26 in its lower part carries clamping rings 27 for attaching the nozzle 8. At the upper part of the bracket 26, a connecting rod 28 connects it to the nozzle 10. The arm 28 is articulated at its two ends to, on the one hand, the bracket 26 about the pivot pin 29 and, on the other hand, a tab 30 fixed to the nozzle 10 about the pivot pin 31. A thumbwheel 32 allows the length of the rod 28 to be adjusted. It is thus possible to perform fine adjustment of the lateral position of the nozzle 10 with respect to the nozzle 8.

Jackets 33 in which there flows a fluid act as a heat exchanger. They allow the ice cream to be heated slightly at its surface to encourage it to flow and to reduce the back-pressure exerted on the extrusion apparatus such as a twin-screw hardener. These jackets may, if necessary, be used on the other hand to cool the ice cream at the surface if it has begun to flow too well, and if this is compatible with the pressure drop experienced by the extruder.

Figure 5:
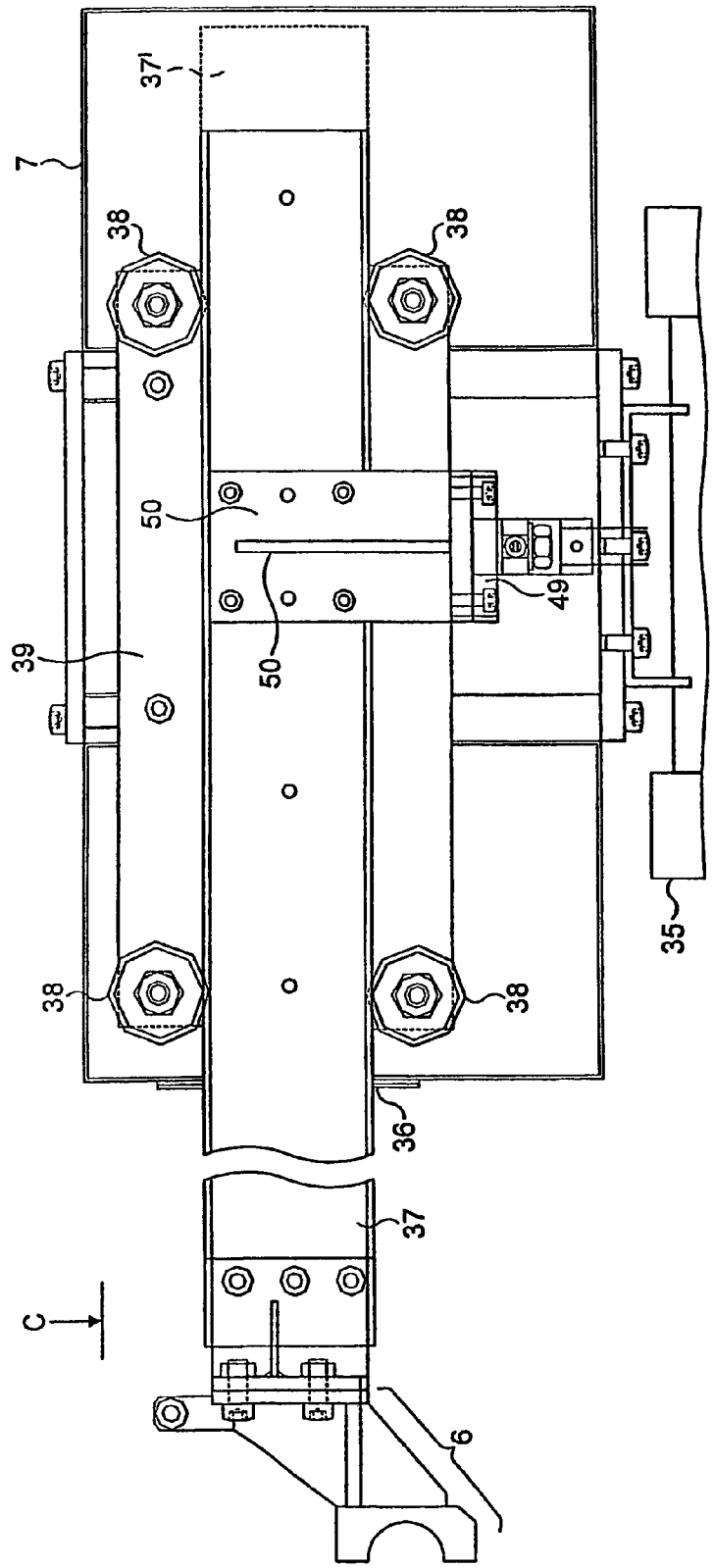
Figure 6:
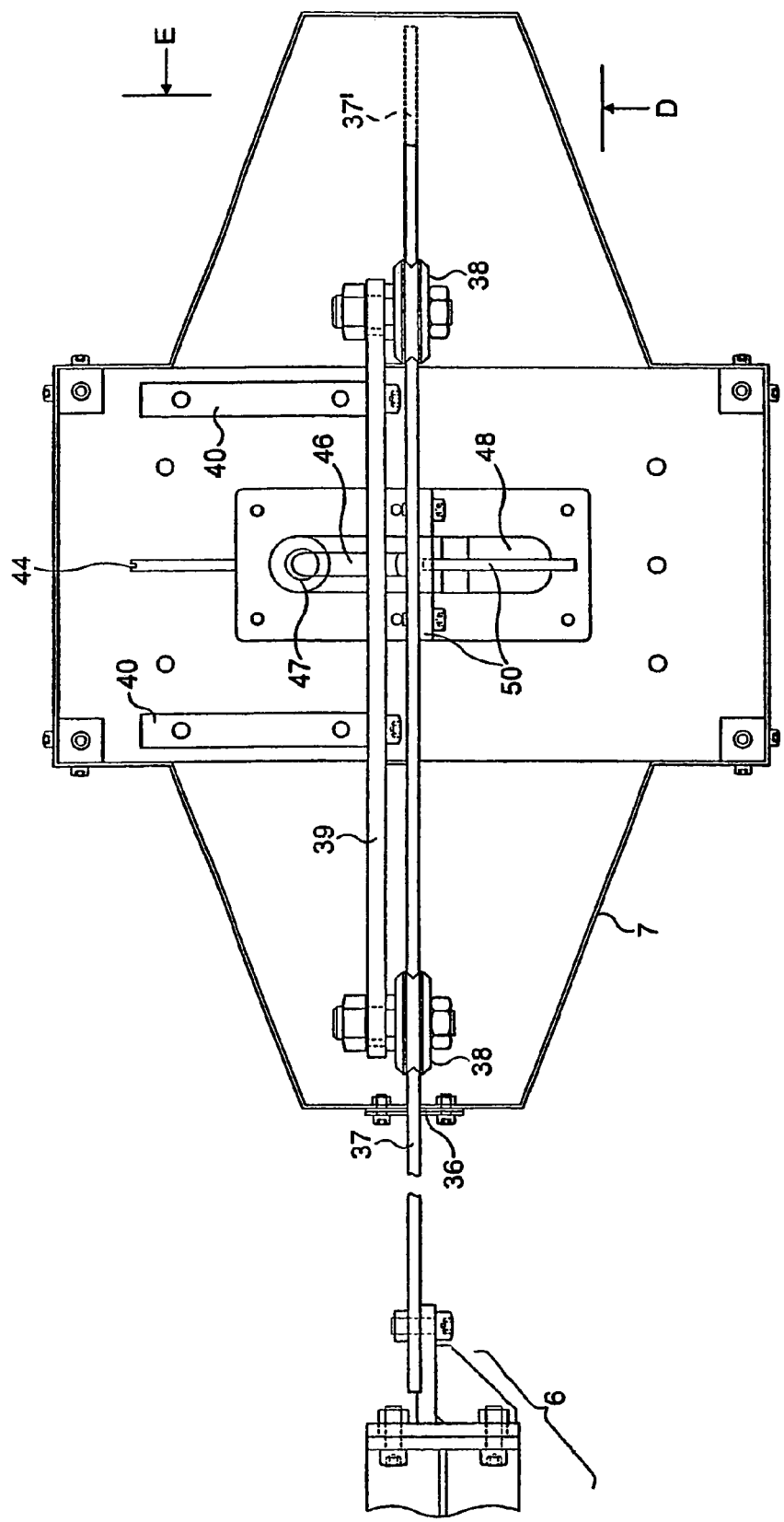
Figure 7:
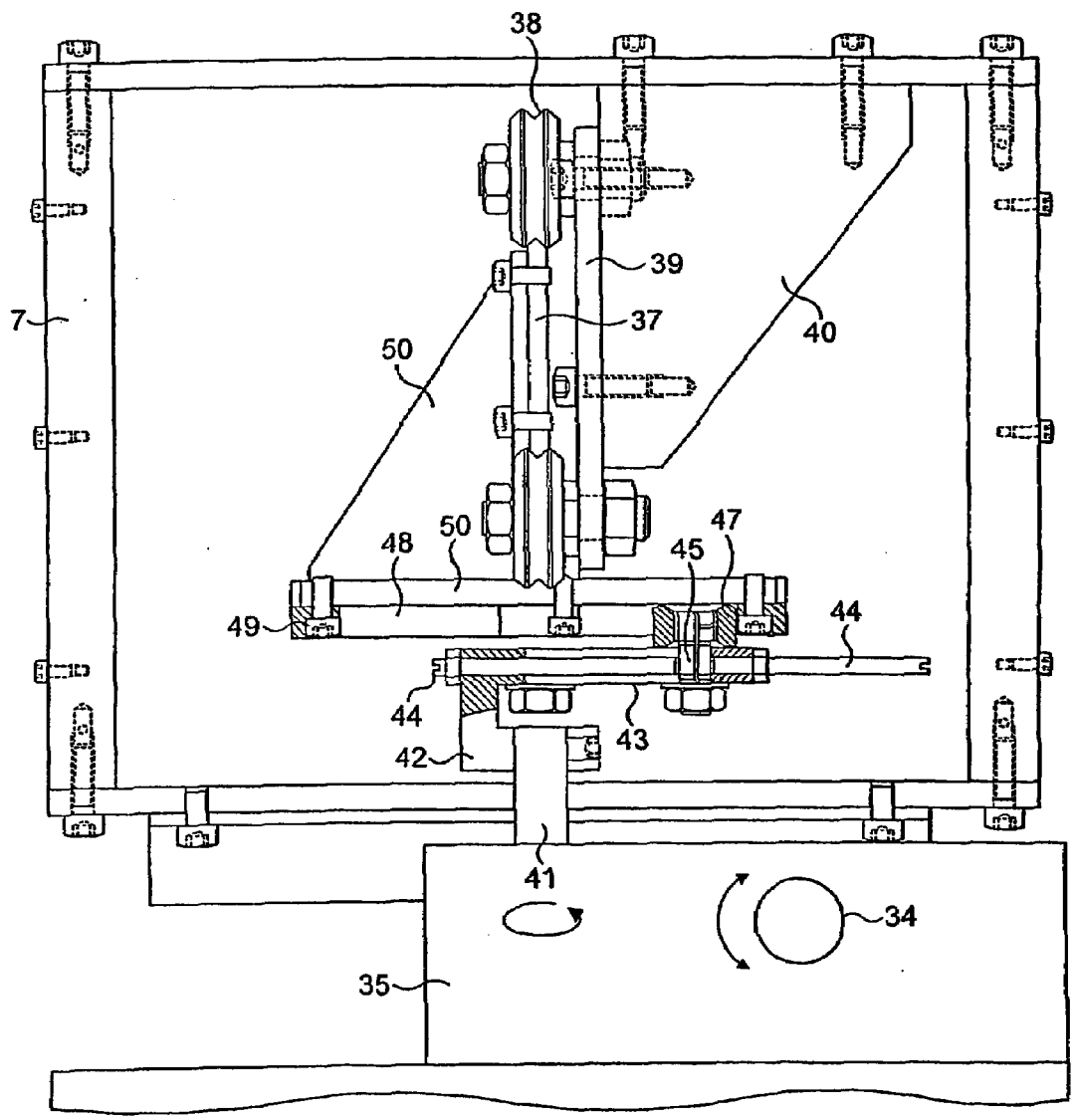

The oscillating support 6 is set in motion with oscillation transverse to the conveyor belt 3. As depicted in FIGS. 5, 6 and 7, the motion mechanism is contained in the casing 7 which is mounted to pivot about the pin 34 on a frame 35. It is thus possible to adjust the inclination of the oscillating support and of the nozzles with respect to the conveyor belt 3. A slot 36 is made in the casing 7 and through this slot there passes the slideway 37 to which the oscillating support 6 is fixed (which support is depicted only in part in FIGS. 5 and 6).

The slideway 37 slides between a set of four rollers 38. The slideway 37 can run freely between the rollers 38, which allows the support 6 to move sideways. The rollers 38 are carried by the plate 39 which is fixed to the roof of the casing 7 by the angle brackets 40.

The drive mechanism proper comprises a motor (not depicted), which actuates the shaft 41 in continuous rotation via a variable speed drive (not depicted). Fixed to the shaft 41 is a crank 42 the lever 43 of which is adjustable via screws 44 which press on the stud 45 which can, before the screws 44 are tightened, slide along a slot 46 made in the arm of the lever 43.

The stud 45 becomes lodged in the wheel 47 mounted on a ball bearing and constitutes the articulated eye of the crank 42. The wheel 47 acts as a bearing for the stud and at the same time can run freely in an oblong groove 48 made in a plate 49, which is itself fixed to a bracket 50. The bracket 50 is in turn fixed to the slideway 37. The assembly comprising the wheel 47 and the groove 48 thus constitutes the cam that drives the slideway 37. By adjusting the length of the arm of the lever 43 it is possible to adjust the amplitude of the lateral oscillation of the nozzle support 6. FIGS. 5 and 6 show the central position of the slideway in solid line and one extreme position in dotted line 37'.

Figure 8:
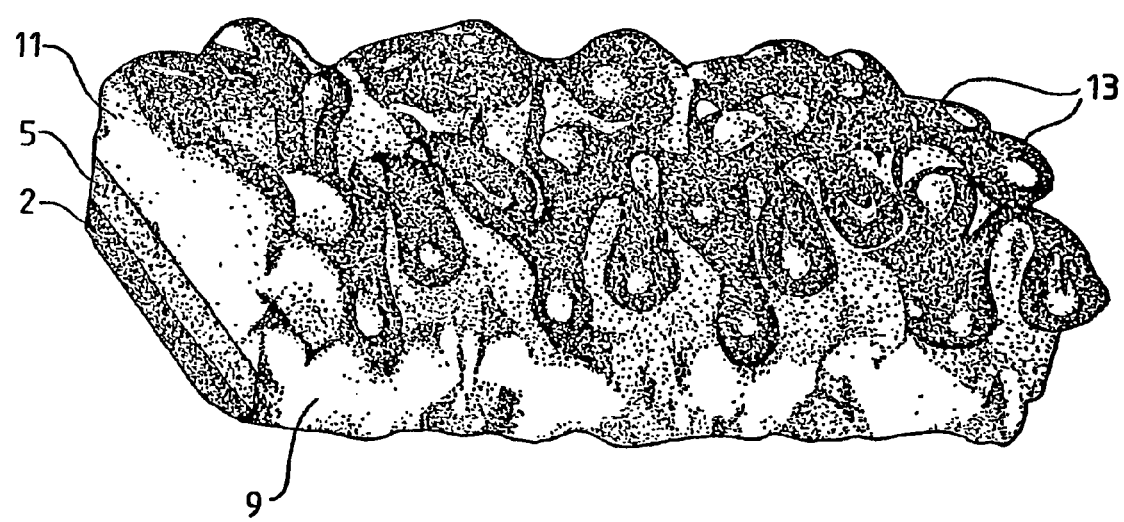
FIG. 8 is a perspective view of a portion of ice cream dessert.

In FIG. 8, a portion of dessert comprises a first layer of sponge cake 2, for example strawberry or chocolate flavored, a layer of strawberry (or chocolate) ice cream 5 containing small pieces of strawberry (or chocolate), a layer of vanilla ice cream 9 deposited horizontally in a zig zag on the layer 5, a layer of vanilla ice cream 11 deposited vertically and forming folds under gravity and an edging of strawberry (or chocolate) sauce emphasizing the gathered frill effect.

What is claimed is:

1. A method of manufacturing an ice cream dessert, which comprises:

depositing an ice cream dessert that has a built-in ice cream confectionery decoration by extrusion from first and second moving extrusion nozzles located one above the other, connected to each other by a joint and placed above a moving support, the first nozzle comprising a flattened end-piece with a slot-shaped outlet that is substantially parallel to the moving support, the second nozzle comprising a flattened end-piece with a slot-shaped outlet that is substantially perpendicular to the moving support;

continuously extruding onto the moving support the ice cream composition in the form of two or more ribbons at a temperature of below −6° C. at the first and second extrusion nozzles;

securing the first nozzle to an oscillating support and securing the second nozzle to the oscillating support in order to provide to the first and second nozzles an oscillating movement transversal to the moving support;

arranging the second nozzle at an incline with respect to the first nozzle;

controlling the extrusion of the ice cream composition at a speed that is greater than that of the moving support; and controlling the first and second nozzles and moving support to have respective movements such that the ribbons are deposited under gravity and have the shape of a gathered frill folded over on itself, with the folds running alternately in one direction and then in the opposite direction to define at least a portion of the built-in ice cream confectionery decoration.

2. The method according to claim 1, wherein the first and second nozzles are orthogonal to one another.

3. The method according to claim 1, wherein the first and second nozzles are arranged in such a way that their outlets form an inverted T.

4. The method according to claim 1, which further comprises providing an edging of sauce upon the ribbons of ice cream composition that is deposited last to make a visual contrast with the ribbons of ice cream.

5. The method according to claim 1, wherein the ice cream and built-in decoration is deposited onto a sausage of ice cream and in that the resulting ice cream, decoration and sausage assembly is cut into portions.

6. The method according to claim 5, wherein the sausage of ice cream is deposited onto a sponge cake and in that the resulting sausage and sponge cake assembly is cut into portions.

7. The method according to claim 1, wherein the ice cream and incorporated decoration are deposited onto a sponge cake and in that the resulting ice cream, decoration and sponge cake assembly is cut into portions.

8. The method according to claim 7, which further comprises the sponge cake with the ice cream and decoration.

* * * * *